United States Patent Office 3,459,723
Patented Aug. 5, 1969

3,459,723
PROCESS FOR OBTAINING CRYSTALLINE POLYVINYL METHYL ETHER OF A PREDETERMINED MOLECULAR WEIGHT
Herman S. Schultz, Easton, Pa., assignor to GAF Corporation, New York, N.Y., a corporation of Delaware
No Drawing. Filed May 17, 1967, Ser. No. 639,061
The portion of the term of the patent subsequent to Apr. 16, 1985, has been disclaimed
Int. Cl. C08f 1/72, 3/38
U.S. Cl. 260—91.1    9 Claims

ABSTRACT OF THE DISCLOSURE

A polymerization process for preparing homopolymers of methyl vinyl ether of controlled molecular weight and characteristic properties which comprises contacting a liquid solution of purified methyl vinyl ether in a nonreactive aromatic solvent at a temperature of from about −100° C. to about −40° C., preferably below −55° C. and a controlled amount of an appropriate chain transfer agent, and with a catalytic amount of a boron trifluoride catalyst in the presence of dioxane all under essentially anhydrous conditions.

BACKGROUND OF THE INVENTION

The present invention relates to processes for obtaining crystalline polyvinyl methyl ether, and in particular, a specific type of crystalline polymer hereinafter to be described of varying but predetermined molecular weights.

In copending application Ser. No. 409,601, filed Nov. 6, 1964, now Patent 3,378,537, there are described new homopolymers of methyl vinyl ether and processes for making such homopolymers. These homopolymers are characterized by unusual physical and chemical properties as emphasized in extremely high molecular weights, high tensile strength, form stability, unique film-forming capabilities, characteristic melting point range and unusual solubility characteristics. As described in the said copending application, the polymers which are produced are uniformly of high molecular weight and in terms of viscosity characteristics have a manifestation of such high molecular weights, the inherent viscosity values of those products range from about 1.1 to 6.0, and preferably are above about 1.8. The products produced by the processes described in the aforesaid copending application are crystalline polymers with percent crystallinity values ranging from about 10% to about 20% as determined by X-ray diffraction and a birefringence melting point range of 60–70° C. The high molecular weight homopolymeric methyl vinyl ether produced in carrying out the processes described in the aforementioned copending application are form-stable products which by virtue of their high molecular weight and narrow molecular weight distribution are particularly adaptable to produce high tensile strength films.

By the processes of the present invention, it now becomes possible to produce homopolymers of methyl vinyl ether having substantially the same unique characteristics of the high molecular weight products produced in the aforementioned copending application, and particularly the properties of characteristic melting point range, unusual water-solubility and degree of structural order. These products, instead of being of only the high molecular weight type, may now be produced at will with varying molecular weights, employing the same high quality methyl vinyl ether monomer used to obtain the highest molecular weight products. This results in homopolymers of varying physical properties, thereby further introducing a greater versatility for such polymers by greatly expanding the variety of potential applications for said polymers. These lower molecular weight polymers find outstanding utility per se and as components in the general areas of adhesives, elastomers, coatings, films, fibers, as plasticizers, high impact additives, clarifiers, processing aids, etc., for various resin systems and hot melt compositions and various combinations thereof, among other applications.

SUMMARY OF THE INVENTION

It is, therefore, an object of the instant invention to produce new, useful and outstanding homopolymers of methyl vinyl ether which are form-stable and which are characterized by outstanding and unusual physical and chemical properties, particularly unique water-solubility characteristics and degree of structural order, as exemplified by characteristic melting point range as determined by disappearance of birefringence and percent relative crystallinity range as determined by X-ray diffraction as well as a controlled level of tensile strength below about 2000 lbs. p.s.i. It is a further object of this invention to provide for the attainment of predetermined lowered molecular weight crystalline polyvinyl methyl ether polymers having the properties and characterizations described above. A still further object of this invention is to provide a process for producing a lowered molecular weight crystalline polyvinyl methyl ether of predetermined and preselected molecular weights which polymers are characterized by the unusual physical and chemical properties described above. Other objects and davantages of this invention will readily appear hereinafter as the description proceeds.

I have now discovered that the above objects may be readily obtained by following the processes described in the aforementioned copending application with the limitation, however, before the polymerization of the selected monomer there is added thereto a controlled amount of an appropriate chain transfer compound such as an alcohol, aldehyde, acylal, ketal, ortho ester or acetal. It has been determined that there is no particular criticality in the type and molecular weight of the alcohol, aldehyde, acylal, ketal, ortho ester or acetal chain transfer agent to be used and that any aliphatic or aromatic compound may be used so long as they are soluble in the reaction medium. However, it is preferred to employ compounds in the form of their aliphatic series containing a carbon content of from about 1 to 20 carbon atoms.

Thus, the instant invention may be more specifically described as a polymerization process for preparing homopolymers of methyl vinyl ether which comprises contacting a liquid solution of methyl vinyl ether in a nonreactive aromatic solvent liquid at a temperature of from about −100° C. to about −40° C. and preferably −80° C. to −55° C. with a boron trifluoride catalyst in combination with dioxane, and before said polymerization under substantially anhydrous conditions takes place, adding thereto a controlled amount of a compound selected from the group consisting of alcohols, ketals, acylals, ortho esters, aldehydes and acetals chain transfer agents.

DESCRIPTION OF THE PREFERRED EMBODIMENTS

Illustrative examples of chain transfer agents include alcohol, aldehyde, acylal, ketal, acetal or ortho ester compounds which may be employed include all of the well known $C_1$ and $C_{20}$ (or even higher) straight and branch chain alcohols and aldehydes such as: methanol; ethanol; propanol; isopropanol; n-butanol; isobutanol; n-dodecanol; n-octanol; oxo-tridecyl alcohol; hexadecyl alcohol; octadecyl alcohol; eicosonol, and the like; formaldehyde;

acetaldehyde; propionaldehyde; butyraldehyde; isobutraldehyde; n-heptaldehyde; undecanal; dodecanal; octadecanol, and the like; 1 - methoxy - 1 - ethyl acetate (1-acetoxy - 1 - methoxyethane); 1 - ethoxy - 2 - butyl propionate; dimethoxy methane; diethoxy methane; dipropoxy methane; dimethoxyethane; diethoxyethane; 1,1 or 2,2 - dimethoxy propane (dimethyl propional acetal) (dimethyl acetone ketal); 1,1 or 2,2 - diethoxy propane; 1,1 or 2,2 - diethoxy butane (diethyl butyral); 1,1 or 2,2 or 3,3 - dimethoxy hexane; triethyl orthoacetate; trimethyl orthoacetate; tripropyl orthoacetate; trimethyl orthoformate; triethyl orthoformate; diethoxy dodecane; dimethyl benzal; dimethyl acetal of stearylaldehyde (octadectanal); phenyl acetaldehyde dimethyl acetal, as well as alkoxyaldehydes such as: 1,1,3 - triethoxy-2-ethyl-butane; 1,3 - diethoxy - 1 - methoxy hexane; 1,1,3-tri-butoxy butane; 1,1,3 - triethoxy octane; 1,1,3 - triethoxy-4-ethyl octane; 1,1,3 - triethoxy - 2,4 - diethyl hexane, and the like.

The additive alcohol, aldehyde, ketal, acylal, ortho ester or acetal compound should be employed in amounts from about 0.01 mole percent to about 2.0 mole percent relative to the methyl vinyl ether monomer and the most preferred range is from about 0.05 mole percent to about 1.0 mole percent. As pointed out above, the specific chemical nature of the additive is not critical, however, the selected compound should be soluble within the limits set forth above in the polymerization reaction mass in order to effect the desired controlled molecular weight formation. Still further, in addition to single component additives, it is possible to use mixtures of different alcohols or different aldehyde or different acetals, etc. or indeed, mixtures comprising an alcohol and an aldehyde or any combination thereof within the limits of the concentrations indicated.

These alcohol, aldehyde, ketal, acylal, ortho ester or acetal additives may be added during the polymerization of the methyl vinyl ether monomer, however, in order to obtain the best results, it is preferred that they be added before any polymerization takes place. Moreover, these additives may be added in any manner, i.e., in undiluted form or after having been diluted with any suitable carrier.

The general polymerization products employed in the present invention follow the procedures described in copending application Ser. No. 409,601, now Patent No. 3,378,537, especially with regard to polymerization reaction temperature, catalyst system and reaction solvents used. Therefore, the teachings of said application are incorporated herein by reference to said application.

In general, the polymerization process involves the employment of a methyl vinyl ether monomer solution into which a catalytic amount of a boron trifluoride-1,4-dioxane catalyst system is injected, all of the operations being carried out in a substantial anhydrous inert atmospheric condition. Polymerization may be carried out at temperatures of from about −100° C. to about −40° C. and preferably below about −55° C. The preferred temperature for polymerization is that obtained with a Dry Ice acetone bath combination which gives a temperature of −78° C., while temperatures as low as −100° C. may be employed, if desired.

The catalyst system employed is a boron trifluoride-1,4-dioxane combination, wherein the mole ratio of 1,4-dioxane to boron trifluoride is at least 1:2 and preferably at least 3:1 or 4:1 with the preferable upper limit no more than about 100:1, and the most preferable range 5:1 to 50:1. The upper limit is by no means critical. The only factor controlling the amount of dioxane is its solubility in other reactants, namely, the methyl-vinyl ether monomer and inert solvent. In general, it has been found that above the 100:1 upper limit, the dioxane is insoluble and therefore this is suggested as the area of cut-off for this ingredient. The boron trifluoride combination catalyst system may be employed in the form of a boron trifluoride-dioxane complex as such or dissolved in an excess of dioxane, or conversely, one may employ a boron trifluoride-etherate complex, for example, a boron trifluoride-diethyl etherate, a boron trifluoride-dibutyl etherate, and the like, dissolved in dioxane, which combination manifests similar unusual catalytic effects as boron trifluoride-dioxane complex itself. Where the catalyst is a boron trifluoride-dialkyl etherate complex in dioxane, the lower limit is not only preferred to be at least about 3:1 (dioxane to dietherate on a molar basis), but in this specific catalyst embodiment it has been found that this lower limit is critical. The upper limits are, however, as indicated above, 100:1 (dioxane to dietherate on a molar basis) with ratios up to 50:1 being preferred.

Higher conversions and best results are generally obtained employing a catalytic concentration relative to the amount of monomer present ranging from about 0.01 mole percent to about 1.5 mole percent and preferably from about 0.05 mole percent to about 0.5 mole percent.

One of the preferred conditions of the polymerization procedure is to employ an inert anhydrous non-reactive aromatic solvent as a carrier for the methyl vinyl ether monomer (so that the reaction system, i.e., solution, is a liquid at the beginning of the polymerization reaction) in order to attain the greatest degree of conversion and polymer of the best and optimum properties mainly because the presence of the solvent or diluent acts as a moderating influence during the polymerization and prevents undesirable reactions and heterogeneity of the product which could result due, among other factors, to the exothermic nature of the polymerization. The use of such inert solvents or diluents in the polymerization of vinyl ethers is well known, but in the present reaction it is preferred to employ an aromatic hydrocarbon solvent, and particularly toluene, for such purposes. It is possible to use, in admixture with the aromatic hydrocarbon, other aromatic hydrocarbons or aliphatic hydrocarbons such as heptane. It has been found that no more than 60 volume percent of such aliphatic hydrocarbons should be used. Still further, while halogenated hydrocarbons have been suggested as solvents in similar reactions, it is preferred not to employ same in the polymerization processes of this invention, since the products obtained thereby do not have the optimum beneficial properties of the homopolymers with which this invention is concerned. The amount of solvent that should be employed should be no less than about 0.5 cc. per gram of monomer, and no more than about 25 cc. per gram of monomer. Within these limits, the preferred monomer solvent ratio on a gram per cc. basis should be 1:2 to 1:10.

In order to obtain the most optimum results, it is preferred to employ materials which are highly purified and thereby substantially anhydrous. It is, therefore, advisable and highly desirable that the methyl vinyl ether monomer be carefully treated to obtain it in a highly purified state. Among the many techniques for purifying this monomer, the following are suggested:

(1) Reacting the monomer over sodium ribbons or a dispersion of sodium in a suitable reaction vessel from about room temperature to about 50° C.

(2) Water wash the monomer, treat it with potassium hydroxide pellets and then with sodium ribbon or a dispersion as in (1) above.

(3) Reflux the monomer over sodium ribbon or dispersion under a suitable fractionating column such as a 30 plate Oldershaw column and treat the best fractions with sodium ribbon or dispersion in an autoclave followed by a second treatment in an autoclave over sodium ribbon.

In place of sodium as a drying agent in the above purification procedures, it has also been found that calcium hydride gives excellent results.

The polymers resulting from the processes of the present invention are, again as pointed out above, not only characterized by an unusual homogeneity with respect to degree and nature of their structural order as exemplified by characteristic melting point range, as determined by disappearance of birefringence, and percent relative crystallinity range, as determined by X-ray diffraction, and unique water solubility characteristics; but are also of lowered molecular weight values than those homopolymers produced by the same process using the same monomers to which no alcohol, aldehyde, acylal, ketal, ortho ester, or acetal chain terminating agent has been added. The products which are obtainable by the instant process may obviously vary in molecular weight as evidenced by measurements of viscosity from which inherent viscosity values can be obtained. In general, the products which are produced by the practice of the process of the present invention are characterized by inherent viscosity values of about 0.2 to about 1.8. The inherent voscosity is related to the molecular weight according to the Mark-Houwink equation (see Makromoleculare, Chemie, vol. 37, pages 187–197, 1960):

$$[\eta] = 7.6 \times 10^{-4} M^{0.60}$$

wherein $[\eta]$ = intrinsic viscosity and M = molecular weight for measurements in benzene. The inherent viscosity, $\eta$, at 0.1% concentration is very close to the intrinsic viscosity and only slightly smaller. Thus, $\eta_{inh} = 2.303 \log \eta_{rel}/C$, wherein C = grams of polymer per 100 cc. solution, $\eta_{rel}$ = relative viscosity and $$[\eta] = \eta_{inh.} \lim_{C \to 0}$$

The tensile strength, elongation and elasticity properties of the homopolymer products of this invention decrease as the inherent viscosity of the homopolymer products decrease. In contrast, the relative crystallinity range and the melting point range of the homopolymer products remain unchanged. The percent "crystallinity" of the instant products are based upon an empirical scale derived from X-ray diffractometer measurements on films. Moreover, depending upon the amount of chain transfer additive used, one can predetermine or preselect for each quality of high puurity level monomer, the desired inherent viscosity, i.e., molecular weight value of the homopolymer products.

The polymers produced in accordance with the present invention are soluble in benzene, in methanol and insoluble in petroleum ether. However, the most unusual solubility characteristic of the polymers is its solubility in water at a temperature below about 10° C. and its insolubility above about this temperature. At a temperature of about 0° C., the polymers swell and are completely dissolved in water. After solution has been effected at 0° C., the polymers remain soluble until a temperature of about 26–30° C. is reached, at which point they precipitate from the water solution.

The following examples are illustrative of the present invention and are not to be regarded as limitative. It is to be understood that all parts, percentages and proportions referred to herein and in the appended claims are by weight unless otherwise indicated.

Example I

In this and the following examples, procedures and techniques are described making use of a dry box containing a dry nitrogen atmosphere. Specific details of such techniques will be found more fully described below.

The polymerization procedure for the following experiments A through E were carried out as a set at the same time under the same conditions. The polymerizations were carried out in carefully cleaned bottles equipped with a perforated crown cap and a self-sealing crown cap liner. The bottles, which were used had first been alternately evacuated and filled with nitrogen on a vacuum manifold several times with intermittent warning with a hot air gun. The reactor (bottles) were capped in a dry nitrogen-filled dry box (or glove box). Hypodermic syringe assemblies and other necessary equipment used during the reaction manipulation were handled similarly. Into the aforementioned nitrogen-filled and capped reactor bottles there was carefully introduced, by way of a hypodermic needle, methyl vinyl ether which had previously been purified and dried over sodium ribbon. The technique for transferring the monomer to the reaction bottles involves vaporizing the monomer from the storage vessel thereof through a closed initially evacuated system and condensing the vapors at a lower temperature (0 to $-10°$ C.) through the aforementioned hypodermic needle which has been previously injected into the reaction vessels. The latter was then placed into a Dry Ice acetone bath at a temperature of $-78°$ C. and into the reaction bottles there was injected by way of a hypodermic needle, purified and dried toluene. The latter was purified and dried over sodium ribbon and was taken from bottles which are capped similarly as the reactor bottles in a dry box and then pressured with dry nitrogen immediately prior to withdrawal into the hypodermic syringe. Into all but one of the toluene monomer solutions, which had been temperature equilibristed at about $-10°$ C., were added various amounts of an anhydrous purified methanol in substantially anhydrous purified 1,4-dioxane solution, containing 0.0315 gram methanol/cc. solution in 1.4 dioxane. These solutions were prepared by drying methanol by distilling under nitrogen from reaction with magnesium ribbon and the purified methanol diluted with purified substantially anhydrous 1,4-dioxane. The monomer solutions were then cooled to $-78°$ C. and a catalyst solution which comprised 0.095 g. of boron trifluoride-diethyl etherate per cc. of solution thereof in 1,4-dioxane was added. The gram methyl vinyl ether per cc. toluene ratio was 1 to 3 in all reactions and the concentration of the $BF_3$-diethyl etherate in 1,4-dioxane was 0.20 mole percent relative to the monomer. The catalyst bottle and the reactors were all equipped with a device which makes it possible to keep a flowing nitrogen atmosphere over the crown caps and still inject or remove reagents to or from a bottle with a hypodermic syringe in a clean essentially moisture and air free fashion. Immediately after the injection of the catalyst, the reaction bottles were given a quick shake and then the reaction was permitted to run overnight. The next day the contents were clear, non-flowing gels at $-78°$ C. (The total reaction time was about 23 hours.) The reactions were then quenched with methanolic ammonia solution, filtered after further dilution with toluene through sintered glass funnels, and the solvent removed by vacuum pumping. Thus, all the experiments were carried out at the same time under the same conditions except for the amount of methanol added. As a control, one experiment was carried out without the addition of any methanol.

All of the resultant homopolymer products form coherent non-tacky self-supporting films. The physical properties of each homopolymer product are recorded in the following table. The inherent viscosity values were measured at 0.1% in benzene.

TABLE I

| Bottle No. | Mole, percent Methanol | Yield, percent | 25° C., $\eta$ inh. | Relative crystallinity, percent | Tensile strength (p.s.i.) | Percent elongation |
| --- | --- | --- | --- | --- | --- | --- |
| A | 0.40 | 91 | 0.58 | 15.9 | 420 | 43 |
| B | 0.20 | 99 | 0.95 | 14.8 | 870 | 635 |
| C | 0.10 | 100 | 1.13 | 13.7 | 1690 | 975 |
| D | 0.05 | 93 | 1.40 | 11.8 | 1810 | 1070 |
| E | 0 | 96.5 | 1.99 | 10.8 | 2030 | 1120 |

The birefringence melting point of all the products fell in the 60 to 70° C. range.

The above results clearly establishes that the instant process makes it possible to produce homopolymers having a lower molecular weight than those produced from the same monomer when no alcohol has been added. Moreover, it is also clear that the instant process now enables the production of homopolymers of predetermined or preselected lowered molecular weights.

Similar results may be obtained by replacing the methanol with some other alcohol such as ethanol, isopropanol, butanol, dodecanol, octadecanol and the like.

Example II

The procedure of Example I was repeated in exactly the same fashion and under the same conditions using the same batch of monomers but substituting a purified dimethyl acetal solution in 1,4-dioxane for the methanol solution. The titer of the diethyl acetal solution was 0.087 gram/cc. solution in 1,4-dioxane. Again the gram methyl vinyl ether per cc. toluene ratio was 1 to 3 and the concentration of the $BF_3$-diethyl etherate in 1,4- dioxane was 0.20 mole percent relative to the monomer. The physical properties of each homopolymer product are recorded in the following table. The inherent viscosity values were measured at 0.1% in benzene.

TABLE II

| Bottle No. | Mole, percent dimethylacetal | Yield, percent | 25° C., η inh. | Relative crystallinity, percent | Tensile strength (p.s.i.) | Percent elongation |
|---|---|---|---|---|---|---|
| A | 0.40 | 91½ | 0.62 | 15.1 | 470 | 75 |
| B | 0.20 | 95 | 0.704 | 12.3 | 510 | 271 |
| C | 0.10 | 95 | 1.09 | 12.6 | 1110 | 681 |
| D | 0.05 | 90 | 1.39 | 9.6 | 1760 | 1030 |
| E | 0 | 93½ | 2.14 | 9.0 | 2200 | 1070 |

The birefringence melting point of all the products fell in the 60–70° C. range.

Similar results may be obtained by replacing the dimethyl acetal with some other acetal, such as diethoxy methane, dipropoxy methane, methoxyethane, dimethoxy propane, dimethoxy hexane and the like.

Example III

The procedure of Example I was repeated except that appropriately equipped round bottomed flasks and a better quality batch of methyl vinyl ether were used, and the methanol additive was undiluted with any carrier. All reactions were initiated with the $BF_3$-diethyl etherate in 1,4-dioxane catalyst at −78° C. and the concentration of said catalyst was 0.20 mole percent relative to the monomer. In each reaction the gram methyl vinyl ether per cc. toluene ratio was 1 to 3.9. The mole percent methanol is relative to the monomer. The reaction ran about 22 hours. The physical properties of each homopolymer product are the same as in the previous examples relative to the molecular weight range. Inherent viscosity values were measured at 0.1% in benzene.

TABLE III

| Reaction No. | Mole Percent Methanol | Yield, Percent | 25° C. η inh. |
|---|---|---|---|
| A | 0.6 | 95 | 0.33 |
| B | 0.85 | 98 | 0.52 |
| C | 0 | 90 | 3.2 |

Example IV

The procedure of Example I was repeated, except the purified n-butyraldehyde solution in 1,4-dioxane was substituted for the methanol solution. The titer of the n-butyraldehyde solution was 0.0466 gram/cc. solution in 1,4-dioxane. Again the gram methyl vinyl ether per cc. toluene ratio was 1 to 3 and the concentration of the $BF_3$-diethyl etherate in 1,4-dioxane was 0.20 mole percent relative to the monomer. The physical properties of each homopolymer product are recorded in the following table. The inherent viscosity values were measured at 0.1% in benzene.

TABLE IV

| Bottle No. | Mole, percent n-butyraldehyde | Yield | 25° C. η inh. | X-ray, percent relative crystallinity | Tensile strength | Percent elongation |
|---|---|---|---|---|---|---|
| A | 0.40 | 89 | 1.11 | 12.2 | 1,360 | 915 |
| B | 0.20 | 95.2 | 1.39 | 11.8 | 1,960 | 1215 |
| C | 0.10 | 95.2 | 1.42 | 11.6 | 1,980 | 1200 |
| D | 0 | 97.2 | 1.80 | 10.2 | 2,330 | 1219 |

The birefringence melting point of all the products fell in the 60–70° C. range.

Similar results may be obtained by replacing the butyraldehyde with acetaldehyde, isobutraldehyde, n-heptaldehyde, dodecanal, octadecanol, and the like.

Example V

A set of bottle reactions were carried out exactly as in Example I, except that purified anhydrous ethyl orthoacetate was used instead of methanol. Similar results were obtained.

Example VI

A set of bottle reactions were carried out exactly as in Example I, except that purified anhydrous 2,2-dimethoxy propane was used instead of methanol. Similar results were obtained.

Example VII

A set of bottle reactions were carried out exactly as in Example I except that purified anhydrous 1-methoxy, 1-acetyloxy ethane was used instead of methanol. Similar results were obtained.

Various modifications and variations of this invention will be obvious to a worker skilled in the art and it is understood that such modifications and variations are to be included within the purview of this application and the spirit and scope of the appended claims.

I claim:

1. In a process for preparing a homopolymer of methyl vinyl ether, said homopolymer being characterized by the following properties: (1) insoluble in water down to about 10° C., (2) precipitates from water solution at about 26° C. to 30° C., and (3) a birefringent melting point of from about 60° C. to 70° C; said process comprising polymerizing methyl vinyl ether by contacting, at a temperature in the range of from about −100° C. to about −55° C., a substantially anhydrous liquid solution of methyl vinyl ether in a non-reactive aromatic hydrocarbon solvent consisting essentially of toluene, with from about 0.01 mol percent to about 2.0 mol percent based on said methyl vinyl ether, of a catalyst of 1,4-dioxane with a member of the class consisting of boron trifluoride and boron trifluoride-dialkyl-etherate, the ratio of 1,4-dioxane to boron trifluoride being 1:2 to 100:1 and the ratio of 1,4-dioxane to boron trifluoride-dialkyletherate being from 3:1 to 100:1; the improvement which comprises adding to said liquid solution before said polymerization takes place, about 0.01 mole percent to about 2 mole percent based on methyl vinyl ether of an aliphatic compound selected from the group consisting of alcohols, aldehydes, ketals, acylals, ortho esters and acetal compounds having from 1 to 20 carbon atoms, as a chain transfer agent to thereby control the molecular weight of the thus prepared homopolymer of methyl vinyl ether.

2. A process as defined in claim 1, wherein the amount of aliphatic compound added ranges from about 0.05 mole percent to about 1.0 mole percent based on the weight of the methyl vinyl ether monomer.

3. A process as defined in claim 1, wherein the solvent is an aromatic hydrocarbon.

4. A process as defined in claim 1, wherein the ratio of the volume in the ccs. of solvent present to the weight in grams of methyl vinyl ether ranges from about 25:1 to 1:2.

5. A process as defined in claim 1, wherein the aliphatic compound is an alcohol.

6. A process as defined in claim 1, wherein the aliphatic compound is an aldehyde.

7. A process as defined in claim 1, wherein the aliphatic compound is an acetal compound.

8. A process as defined in claim 1, wherein the aliphatic compound is acylal.

9. A process as defined in claim 1, wherein the aliphatic compound is an ortho ester.

References Cited

FOREIGN PATENTS 923,386  4/1963  Great Britain.

JAMES A. SEIDLECK, Primary Examiner

J. A. DONAHUE, Assistant Examiner